No. 846,130. PATENTED MAR. 5, 1907.
J. P. MÜLLER.
COMBINED WAGON AND SLED.
APPLICATION FILED FEB. 17, 1906.
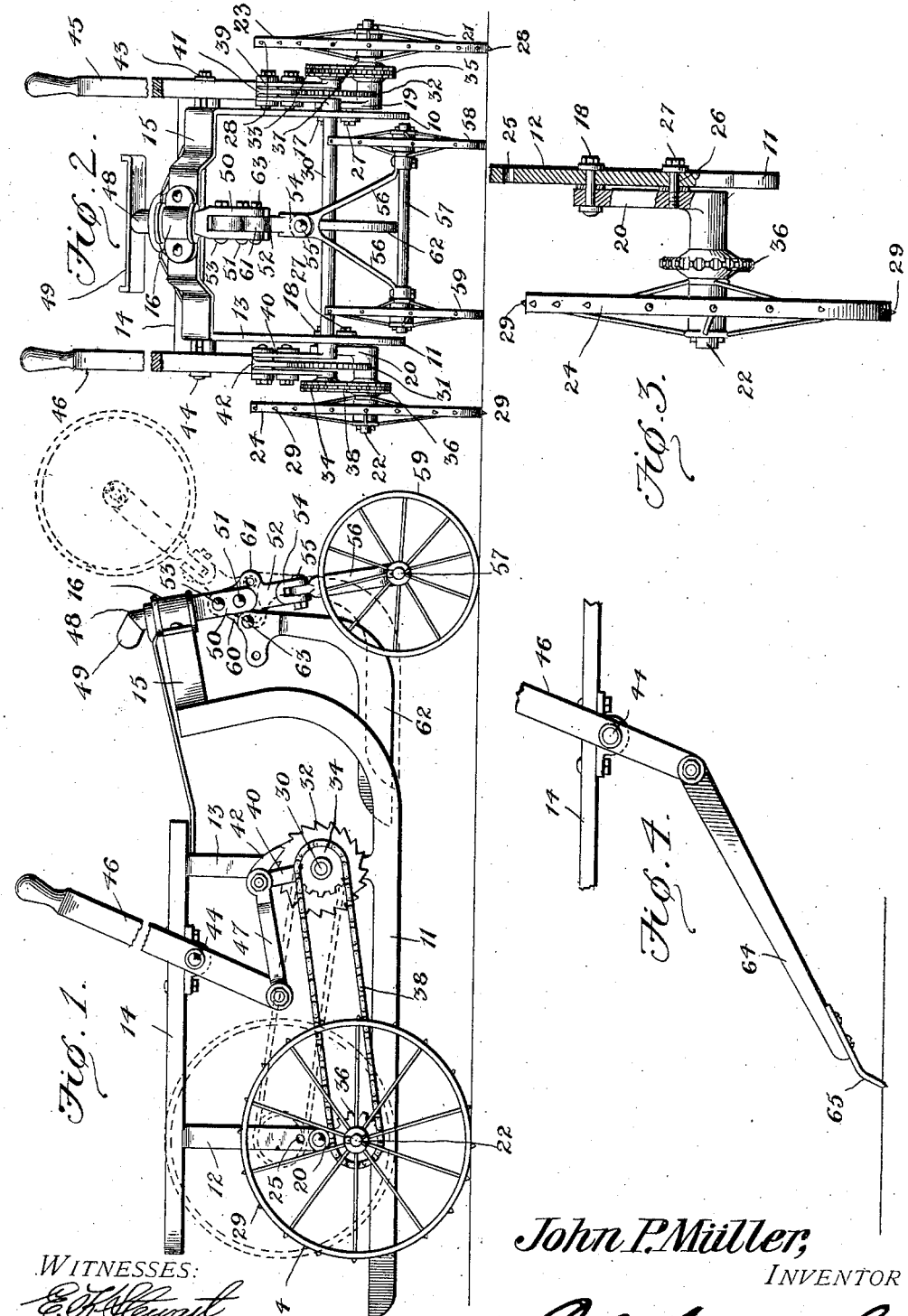
WITNESSES:
E. F. Stewart
C. N. Woodward
John P. Müller,
INVENTOR
By C. A. Snow & Co.
ATTORNEYS

UNITED STATES PATENT OFFICE.

JOHN P. MÜLLER, OF FREEPORT, ILLINOIS.

COMBINED WAGON AND SLED.

No. 846,130.　　　　　Specification of Letters Patent.　　　　Patented March 5, 1907.

Application filed February 17, 1906. Serial No. 301,645.

*To all whom it may concern:*

Be it known that I, JOHN P. MÜLLER, a citizen of the United States, residing at Freeport, in the county of Stephenson and State of Illinois, have invented a new and useful Sled and Wagon, of which the following is a specification.

This invention relates to combined sleds and wagons, more particularly to the class of coasting sleds and wagons, and has for its object to produce a simply-constructed device of this character which may be quickly and easily changed from one to the other and without detaching any of the parts.

With these and other objects in view, which will appear as the nature of the invention is better understood, the invention consists in certain novel features of construction, as hereafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportions, and minor details of construction may be resorted to without departing from the principle or sacrificing any of the advantages of this invention within the scope of the appended claims.

In the drawings, Figure 1 is a side elevation of the device arranged as a coasting-wagon. Fig. 2 is a front elevation of the same. Fig. 3 is an enlarged detail, partly in section, of one of the traction-wheels and its supporting mechanism. Fig. 4 is a detail view of a modified construction of the propelling mechanism.

The improved device comprises a supporting-frame including spaced runners 10 11, standards 12 13, and a seat or platform 14, the runners extending forwardly of the platform and connected by a transverse portion 15, having a socket 16 centrally thereof, the latter to support the steering apparatus, as hereafter described.

Pivoted at one end at 17 18 to the rear standards 12 are arms 19 20, the latter having stub-shafts 21 22, extending from the other ends and carrying ground traction-wheels 23 24.

The rear standards 12 are provided with spaced bolt-holes, (indicated at 25 26,) and the arms 19 20 are each provided with a corresponding bolt-hole for alternate registration with the bolt-holes 25 26, so that when the arms 19 20 are in their lower position, as shown in full lines in Figs. 1 and 3, clamp-bolts 27 may be inserted through the aperture 26 in the standard and into an aperture in the arms, and thus lock the wheels in their downward position.

When the arms 19 20 are reversed in position, the bolts 27 will engage the upper apertures 25, and thus lock the wheels in their upward position, with the rims substantially level with the bottoms of the runners 10 11, as indicated by dotted lines in Fig. 1.

The wheels 23 24 are provided with spaced spurs 28 29 to engage the ground, ice, or snow, and thus assist in propelling the vehicle.

Journaled through the forward standards 13 is a shaft 30, having ratchet-wheels 31 32 and chain-wheels 33 34 at the ends, the chain-wheels being in alinement with like chain-wheels 35 36 on the hubs of the wheels 23 24 and connected by chains 37 38. Swinging upon the shaft 30 at opposite sides of the ratchet-wheels 31 32 are radius-bars 39 40 and carrying-pawls 41 42 for engaging the teeth of the ratchet-wheels. Pivoted at 43 44 to the platform 14 are operating-levers 45 46, connected by links to the radius-bars 39 40, one of the links being shown at 47. By this arrangement it will be obvious that the operator upon the platform 14 by actuating the levers 45 46 will cause the pawls 41 42 to intermittently engage the ratchet-teeth of the wheels 31 32, and thus rotate the shaft 30 and transmit the motion through the chains 37 38 to the ground-wheels 23 24.

If the device is to be employed as a wagon, the wheels 23 24 are depressed, as in full lines in Figs. 1, 2, and 3, and if it is to be employed as a coasting-sled the bearing-wheels are elevated and the spurs 28 29 utilized to propel the sled, as will be obvious.

Swinging in the socket 16 at the forward end of the frame is a shaft 48, having foot-rests 49 at the upper end and forked, as at 50, at the lower end.

Swinging by a pivot 51 between the forked portion 50 is a plate 52, extended at the upper end and secured by a bolt 53 between the sides of the forked portion 50 of the shaft 48, and pivoted at 55 in the forked portion of the plate is a yoke-frame 56, the lower ends of the yoke connected to an axle 57, upon which combined ground and steering wheels 58 59 are journaled.

The wheels 58 59 are thus free to swing laterally upon the pivot 55, but will likewise swing horizontally with the shaft 48 when the latter is oscillated by the foot-lever 49.

An efficient steering device is thus produced under the control of the operator setting upon the platform 14 by the action of his feet and transversely flexible to enable it to readily adapt itself to any irregularities of the surface over which the vehicle travels.

The plate 52 is formed with two lugs 60 61, having apertures spaced equidistant from the aperture for the pin 51 and likewise spaced the same distance from the aperture for the pin 53 that the aperture for the pin 51 is spaced from the aperture for the pin 51, so that when the pin 53 is removed the plate 52, carrying the yoke 56, axle 57, and wheels 58 59, may be elevated, as shown by dotted lines in Fig. 1, until the aperture in the lug 61 registers with the aperture for the pin 53 in the forked portion 50, when the pin may be reinserted and hold the steering-wheels in elevated position, which will be done when the device is to be used as a sled.

A steering blade or "rudder" 62 is pivoted at 63 to the lug 60 and hangs therefrom in inoperative position when the steering-wheels are depressed or when the device is used as a wagon.

When the steering-wheels are elevated, the rudder member will be depressed, as in dotted lines in Fig. 1, which movement will bring the lugs of the rudder member in position to be bolted to the extended end of the plate 52 or the portion of the plate through which the pin 53 passes when the steering-wheels are in depressed position. By this means the rudder member takes the place of the steering-wheels and is operated by the same means when the device is to be employed as a sled.

If required, the chains 37 38 may be detached from the chain-pulleys and the links 47 disconnected from the levers 45 46 and push-rods pivoted to the levers, one of these rods being shown at 64 in Fig. 4 and with a spur 65 on the free end for engaging the ground, ice, or snow, as the case may be.

The device may be applied to any form of sled structure, as will be obvious.

Having thus described the invention, what is claimed is—

1. In a combined sled and carriage, including a supporting-frame platform and spaced runners, wheels movably connected to said frame, means for disposing said wheels to support said runners at one end spaced from the ground or to permit the runners to bear upon the ground, a steering element movably connected to said frame, and means for disposing said steering element to support the runners at the other end spaced from the ground or bearing upon the same.

2. In a combined sled and carriage, including a supporting-frame, platform and spaced runners, wheels movably connected to said frame, means for disposing said wheels to support said runners spaced from the ground or to permit the runners to bear upon the ground, a substantially vertical shaft mounted for rotation upon said frame and with foot-rests at one end, a steering element movably connected to said shaft, and means for disposing said steering element to support said runners spaced from the ground or to permit the runners to bear upon the ground.

3. In a combined sled and carriage, including a supporting-frame platform and runners, arms swinging upon said frame and having ground-wheels rotatively mounted upon their free ends, steering-wheels swinging horizontally upon said frame, a steering-runner associated with said steering-wheels, means for disposing said arms in one position to cause said runners and wheels to simultaneously bear upon the ground, and for disposing said arms in another position to cause said wheels to support the frame and runners above the ground, means operative from said platform for rotating said wheels, and means for causing said steering-wheels and steering-runner to alternately bear upon the ground.

4. In a combined sled and carriage, including a supporting-frame platform and runners, arms swinging upon said frame and having wheels rotatively mounted upon their free ends, means for disposing said arms to cause said runners and wheels to simultaneously bear upon the ground or to cause said wheels to support the frame and runners above the ground at one end, means operative from the platform for rotating said wheels, a substantially vertical shaft mounted for rotation upon said frame and with foot-rests at one end, a steering element connected to said shaft, and means for disposing said steering element to support said runners at the other end spaced from the ground or bearing upon the same.

5. In a combined sled and carriage, including a supporting-frame platform and spaced runners, wheels movably connected to said frame, means for disposing said wheels to support said runners spaced from the ground or to permit the runners to bear upon the ground, a substantially vertical shaft mounted for rotation upon said frame and with foot-rests at one end, an arm swinging from said shaft longitudinally of the frame, and a steering element swinging from said arm transversely of the frame.

6. In a combined sled and carriage, including a supporting-frame platform and spaced runners, wheels movably connected to said frame, means for disposing said wheels to support said runners spaced from the ground or to permit the runners to bear upon the ground, a substantially vertical shaft mounted for rotation upon said frame and with foot-rests at one end, an arm swinging from said shaft longitudinally of the frame, and a yoke-frame swinging from said arm transversely of the frame and carrying spaced steering-wheels.

7. In a combined sled and carriage, including a supporting-frame platform and spaced runners, wheels movably connected to said frame, means for disposing said wheels to support said runners spaced from the ground or to permit the runners to bear upon the ground, a substantially vertical shaft mounted for rotation upon said frame and with foot-rests at one end and forked at the other end, an arm pivoted between said forked portion, a steering element swinging from said arm, and means for securing said steering element in position to support said runners above the ground or bearing upon the same.

8. In a combined sled and carriage including a supporting-frame platform and spaced runners, ground-wheels movably connected to said frame, steering-wheels movably supported on said frame, a steering-runner associated with said steering-wheels, means for disposing said ground-wheels and runners to simultaneously engage the ground, and for disposing said ground-wheels to support the runners above the ground, means operative from the platform for rotating said ground-wheels, and means for causing said steering-wheels and steering-runner to alternately bear upon the ground.

In testimony that I claim the foregoing as my own I have hereto affixed my signature in the presence of two witnesses.

JOHN P. MÜLLER.

Witnesses:
W. N. CRONKRITE,
C. B. COURTNEY.